United States Patent [19]

Eggenmueller

[11] Patent Number: 5,092,114
[45] Date of Patent: Mar. 3, 1992

[54] APPARATUS FOR HARVESTING OF FIELD-FODDER

[76] Inventor: Alfred Eggenmueller, Schuetzenweg 10, 7915 Elchingen, Fed. Rep. of Germany

[21] Appl. No.: 607,330

[22] Filed: Oct. 31, 1990

Related U.S. Application Data

[63] Continuation-in-part of Ser. No. 294,011, Jan. 6, 1989, Pat. No. 4,999,987.

[30] Foreign Application Priority Data

| Jan. 11, 1988 | [DE] | Fed. Rep. of Germany | 3800479 |
| Jun. 1, 1988 | [DE] | Fed. Rep. of Germany | 3818578 |
| Aug. 30, 1988 | [DE] | Fed. Rep. of Germany | 3829314 |

[51] Int. Cl.⁵ .................................. A01D 39/00
[52] U.S. Cl. ................................. 56/341; 56/343; 100/50; 100/189
[58] Field of Search ............ 56/341, 343, 344, DIG. 2; 100/49, 50, 189, 188 R, 142, 208

[56] References Cited

U.S. PATENT DOCUMENTS

| 2,552,888 | 5/1951 | Druetta | 100/189 |
| 3,384,007 | 5/1968 | Boje et al. | 100/188 R X |
| 4,104,853 | 8/1978 | Howard et al. | 56/341 |
| 4,157,643 | 6/1979 | White | 56/341 |
| 4,170,934 | 10/1979 | Oosterling et al. | 56/344 X |
| 4,198,904 | 4/1980 | Cheale et al. | 56/343 X |
| 4,275,550 | 6/1981 | Swenson et al. | 56/341 |
| 4,372,104 | 2/1983 | Simonis et al. | 56/341 |
| 4,569,282 | 2/1986 | Galant | 56/341 X |
| 4,604,858 | 8/1986 | Esau et al. | 56/341 |
| 4,750,418 | 6/1988 | Naaktgeboren | 100/50 |
| 4,782,651 | 11/1988 | Ratzlaff | 56/341 |
| 4,803,832 | 2/1989 | Crawford | 56/341 |
| 4,999,987 | 3/1991 | Eggenmueller | 56/341 |

FOREIGN PATENT DOCUMENTS

| 74533 | 3/1983 | European Pat. Off. | 56/344 |
| 120780 | 10/1984 | European Pat. Off. | 56/341 |
| 3239932 | 5/1984 | Fed. Rep. of Germany | 56/344 |
| 3439035 | 4/1986 | Fed. Rep. of Germany | 56/344 |
| 3445015 | 10/1987 | Fed. Rep. of Germany . | |
| 8501745 | 1/1987 | Netherlands | 56/341 |

*Primary Examiner*—Hoang C. Dang
*Attorney, Agent, or Firm*—Lowe, Price, LeBlanc & Becker

[57] ABSTRACT

In an agricultural pick-up baler, forming rectangular bales of harvested agricultural material or field fodder like hay, straw, grass-silage, the agricultural material is loaded to a compressing device shredding and crushing the fodder to a highly densified tough layer, urged to a baling chamber via a press channel. The fed-in portion of the layer is then additionally densified and compacted at its flat side by a pressing plate against the resistance of friction within the baling chamber with simultaneous extruding said rectangular bale through a rear discharge opening of said baling chamber.

By the crop baler according to the invention properly shaped and highly densified bales are produced with relatively light-weighted and simple-driven compacting structural elements. Thus, the massive and expensive pitman-and-crank-assembly of conventional balers can be avoided.

6 Claims, 8 Drawing Sheets

APPARATUS FOR HARVESTING OF FIELD-FODDER

This is a continuation-in-part of application Ser. No. 07/294,011 filed on Jan. 6, 1989, now U.S. Pat. No. 4,999,987.

FIELD OF THE INVENTION

The present invention generally relates to agricultural crop balers and more particularly to a crop baler for harvesting of agricultural material like hay, straw, grass-silage or corn wherein the material is picked-up from the ground, compressed by a tine-drum and loaded into a baling chamber, to form a rectangular bale.

BACKGROUND OF THE INVENTION

Most of so-called large or big square balers in use work according U.S. Pat. No. 4,372,104, wherein a pick-up device loads harvested agricultural material into a supply passage, connected to the inlet opening of a baling chamber. A pressing ram is reciprocated back and forth in said horizontally arranged baling chamber or compressing channel by at least one plunger for compacting the material to a big square bale up to a weight of one ton. Usually, the drive assembly of the plunger is a pitman-and-crank-assembly coupled to a gear-box, as disclosed in U.S. Pat. Nos. 4,275,550 or 4,604,858 or 4,782,651 or 4,525,991, respectively. These drive means are rather voluminous and have many components thus being relatively expensive to produce.

A similar crop baler is disclosed in U.S. Pat. No. 4,157,643, wherein the agricultural material is moved through the supply passage to the baling chamber by a stuffing or feeding device extending into the supply passage with a plurality of fork-like fingers or tines. The crop entering the compressing channel is only low compressed by the tines of a packer. Actuation of the plunger and the stuffing fork occurs in response to obtaining a predetermined density of the accumulated charge as sensed by a pressure-sensitive device on the loading duct. However, the predensification remains rather low; thus, the plunger has to reciprocate along a way which is at least two times greater than the width of the feeding duct. Thus the main compacting work has to be done by said pressing ram, which has to be very heavy dimensioned. Furthermore, the drive means of the feeding mechanism is rather complicated, as this crop baler needs a loader separate from said packer to stuff the precompressed charge into the baling chamber.

As the agricultural material has a certain elasticity when compressed, the compressed material reexpands in the baling chamber upon the return movement of the reciprocating ram. Thus, with this method the material is compressed several times causing a loss of energy and the degree of compression is relatively low due to the reexpansion of the material.

The German Patent No. 34 45 015 discloses a rotary compressing drum with tines, the tips of which engage grooves in the drum casing, thus shredding and crushing the material. In this way a densified layer is produced, which is accumulated in a box to a rectangular bale.

Although the degree of compression is higher than with the above-mentioned usual big balers, it is desirable to improve the density to achieve highly densified bales which may be transported and stored with minimum space.

Furthermore, the forming of a rectangular bale according to the German Patent No. 34 45 015 is very complicated, as the layers are piled up in a generally vertical box by lowering the groundplate of this box step-by-step. Thus, the size of the accumulated bale is very difficult to change. After forming one big bale consisting of about ten to twenty layers the groundplate has to be lifted in only a few seconds, as the feeding of the material is continuous. As the doors of the box have to be opened and the knotting device has to be operated by a very complicated hydraulic control circuit. Thus, continuous, fast operation of the crop-baler is very difficult to achieve. The same is true for the loading apparatus of above-mentioned U.S. Pat. No. 4,157,643, as the stuffing fork must be operated very rapidly during retracting movement of the plunger in order to assure completely stuffing as described in said patent. Consequently, the drive means have to be rather complicated to achieve said rapid charging stroke by means of a clutch device with several springs, sprockets and projections, which may wear out because of frequent actuation.

It is a primary object of the invention to provide a crop baler for harvesting of agricultural material, achieving a high compression without reexpansion of the bale.

It is further object of the invention to provide a compact design of the baler and simple drive means having a small number of components.

Still another object of the invention is to provide a baler allowing continuous, fast operation in the field.

These and other objects are obtained by a crop baler for harvesting of field-fodder like hay, straw, grass-silage and forming substantially rectangular bales thereof in a baling chamber comprising pick-up means for picking up the field-fodder from the ground; a compressing drum rotating in a drum casing and provided with tines for shredding and crushing the field-fodder picked up by said pick-up means to a highly densified layer; a press channel forming an output of the compression drum, having a slotted portion for permitting passage of said tines and conveying said layer formed in said compression drum by further densifying said layer through an inlet opening into said baling chamber; a compressing plate arranged at an end surface of said baling chamber and reciprocatable in said baling chamber by a distance approximately corresponding to the width of said press channel for pressing said layers accumulating in said baling chamber in said direction toward an discharge opening of said baling chamber; and a detector means arranged near an upper side of said baling chamber for initializing said reciprocating movement of said compressing plate upon arrival of said layer at said upper side of said baling chamber.

As the result of this crop baler according the invention the already densified layer is further compressed and compacted at its flat side thus increasing the degree of density of the rectangular bale. Since the agricultural material fed into the baling chamber is already highly pre-densified by the compressing drum and the press channel the drive means of the compressing plate may be designed simple and less strong. By further compressing the layer at its flat or main side a reexpansion is avoided, since in contrast to the known big balers the crop material is not loosely fed into the baling chamber but as a high-densified layer. In contrast to the apparatus of the German Patent No. 34 45 015 the dimensions of the rectangular bale, especially the length of the bale may be easily changed by varying the number of compressed layers.

With this crop baler it is not necessary to use haydogs or the like as they are used in connection with the bale chamber in U.S. Pat. No. 4,782,651 for holding a freshly compacted charge of material against retrograde movement after being pressed rearwardly by the plunger, because the highly densified layer which is cut off near the inlet opening does not reexpand.

Due to this structure the layers and the resulting rectangular bale remain well shaped and form fitting, thus enabling a high degree of compression achieved with low energy.

In a preferred embodiment the main compression by the tine-drum arrangement is very high, so that the layer in the press-channel will not be compressed in longitudinal direction anymore. To enable a continuous operation of the crop baler during the forward movement of compressing-plate into the baling chamber there is provided a slotted lateral wall, which is displaceable in a longitudinal direction of that press channel, thus interrupting the supply of the high-densified layer to the press channel by the compressing-drum.

BEST MODE OF CARRYING OUT THE INVENTION

Figure 1:
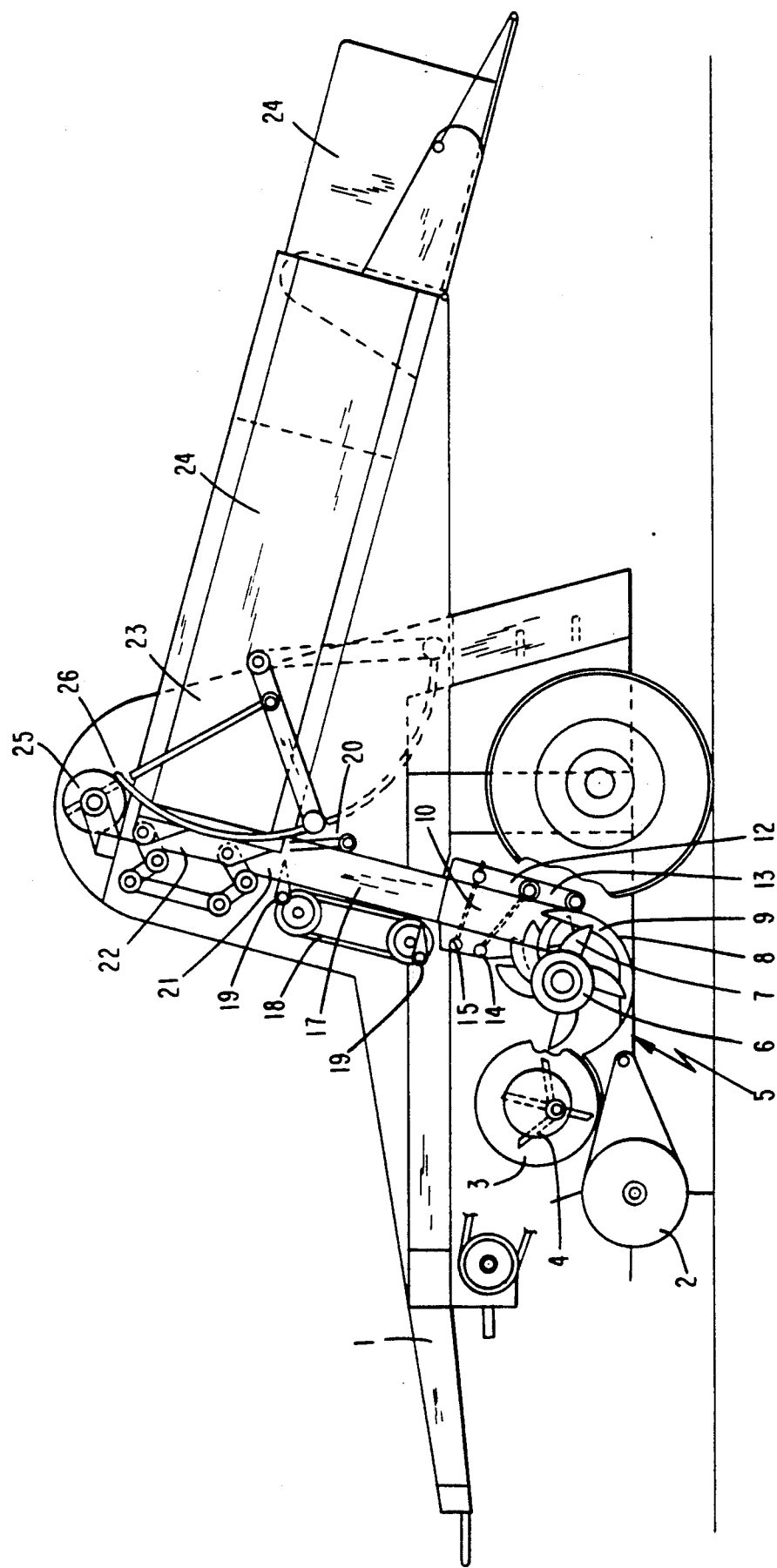
FIG. 1 is a schematic elevational view of a crop baler constructed in accordance with principles of the present invention, various phantom lines being utilized to illustrate operating positions of the cooperating components of the baler.

FIG. 1 shows the principal structure of a baler according to the invention comprising a frame 1 on which is mounted a pick-up device 2 for taking up the field-fodder from the ground with the baler travelling over the field. The crop is transferred to a center gathering auger 3 with a central packing device 4 to supply the crop to the compressing device 5. The latter consists of a drum 6 provided with radially projecting tines 7 arranged in a twisted winding around the drum 6. The tips of the tines 7 engage with a plurality of grooves 9 formed in a drum casing 8. For further details of this arrangement and the design of the press-channel it is referred to the German Patent 4 45 015.

The field-fodder crushed and shredded in this compressing device 5 is fed by the drum 6 into a press channel 10 which is formed by a slotted wall 11 (shown in FIGS. 3, 5 and 6), an adjustable bottom wall 12 and side walls 16. Adjusting means for adjusting the bottom wall 12 and/or a wall 15 which is an extension of the slotted wall 11 are enumerated with 13 and 14. These adjusting means 13,14 are used to vary the cross section of the press channel 10 in order to vary the density of the layer, which is output by the compressing device 5.

Extending the press channel 10 a buffer-part 17 is provided to store the compressed layer when an inlet opening 21 of the baling chamber 23 is closed. Preferably the length of said buffer-part 17 of the press channel 10 corresponds to the height of the baling chamber 23. In this buffer-part 17 of the press channel 10 a conveying device 18 having forks 19 may be arranged for additional urging the layer into the baling chamber 23. It should be noted that this conveying device 18 is not absolutely necessary for the operation of the crop baler, as it may be gathered from FIG. 4 to FIG. 6, wherein the press channel 10 is designed without any conveying device 18. In the embodiment according to FIG. 1 the conveying device 18 transfers a compressed layer stored in the buffer-part 17, into the baling chamber 23 through its inlet opening 21, when detected by a detector 20.

The baling chamber 23 has a rectangular cross-section and is fixed on the frame 1 extending generally horizontally to a rear discharge opening of the baling chamber 23. After transferring said layer through the inlet opening 21, the layer is pressed towards the rear discharge opening by the compressing-plate 22, which is reciprocable by distance corresponding to the width of the layer which inturn corresponds to the width of the press channel 10. By moving to the right in FIG. 1, the compressing plate 22 presses against the flat or main side of the layer against the resistance of friction within said baling chamber 23 increasing the density of the layers and the rectangular bale 24 formed thereof. When the rectangular bale 24 reaches the desired length, which is nearly the length of the baling chamber 23 (see FIG. 1), a knotting device 25 and a knotting needle 26 is actuated as shown in FIG. 1. It may be gathered from FIG. 1, that a first rectangular bale 24 is just being knotted, whilst (on the right portion of FIG. 1) a second rectangular bale 24 is extruded through the discharge opening of the baling chamber 23. This is also shown in FIG. 2, wherein four twines, which may be of sisal, plastic or wire, are wound around the second bale 24,just leaving the baling chamber 23.

Figure 2:
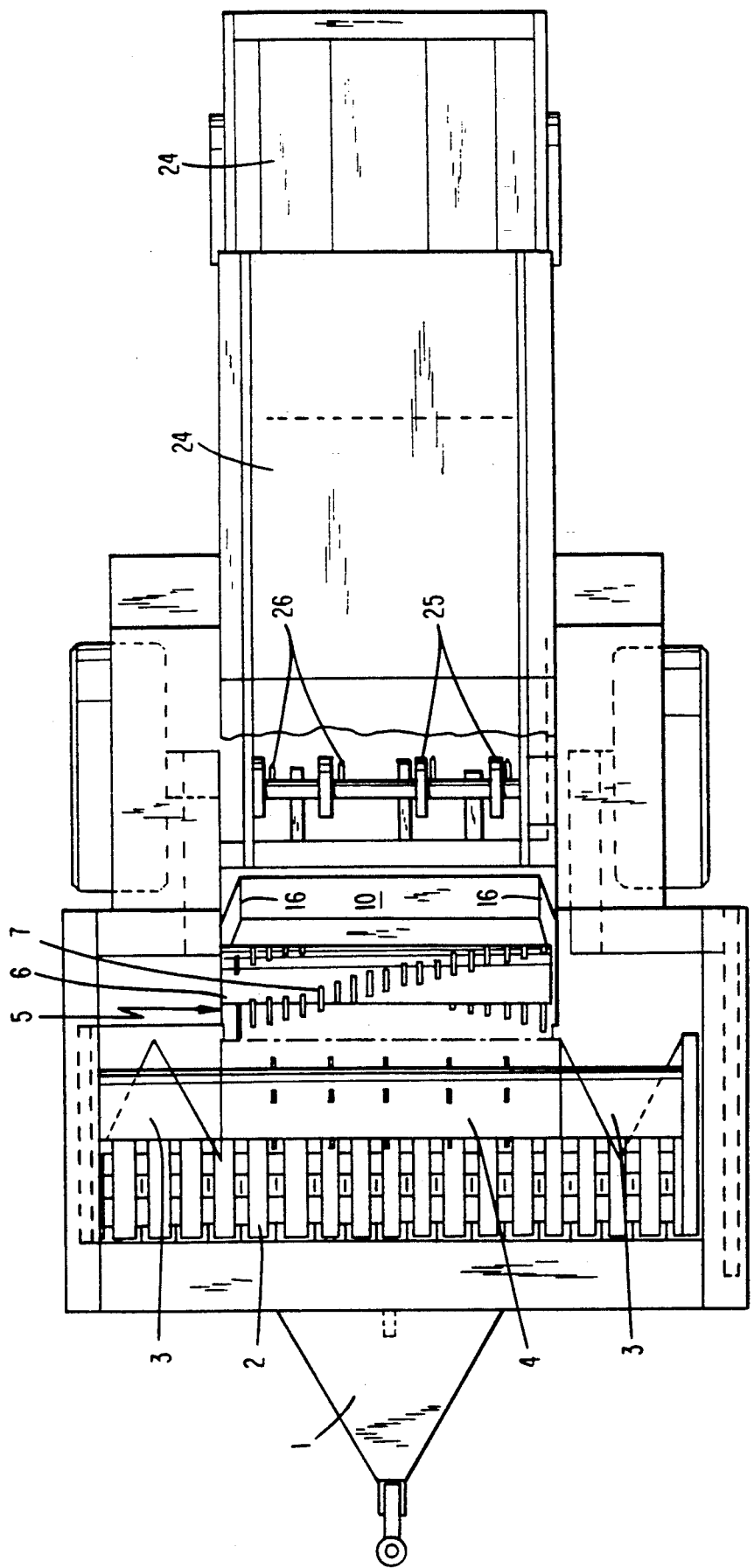
FIG. 2 is a sectional top view on the baler according to FIG. 1

FIG. 2 illustrates the baler of FIG. 1 in a top view-,especially showing the arrangement of the tines 7 in a twisted winding and the cross section of the press channel 10. Further the rectangular cross-section of the layer, formed in this press channel 10, may be gathered from this view.

Figure 3:
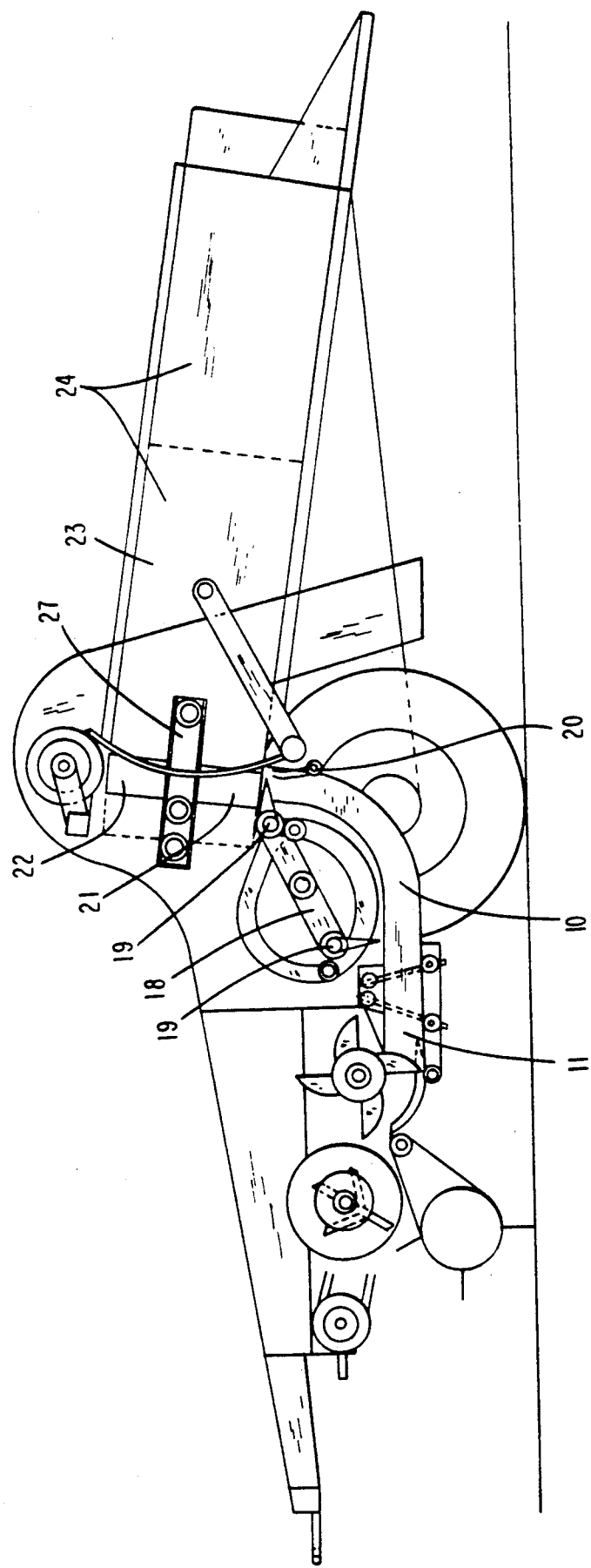
FIG. 3 shows an embodiment of the invention.

According to FIG. 3 the press channel 10 is arranged generally horizontally to reduce the overall height of the baling apparatus. In contrast to the embodiment of FIG. 1 the conveying device 18 is designed as a rotary conveyer with two forks 19,engaging the kidney-shaped press channel 10 alternatively on command of the detector 20,as a variation of the chain conveyer in FIG. 1. It should be noted, that in contrast to the device according to U.S. Pat. No. 4,157,643 wherein the plunger is used as a closure of the inlet opening, the upper fork 19 is disposed at the inlet opening 21. Therefore, the conveying device 18 has not to be operated very rapidly, but rather slowly, thus avoiding complicated drive means. The compressing plate 22 in this embodiment is guided by a roller guide 27, instead of a lever guide in FIG. 1.

Figure 4:
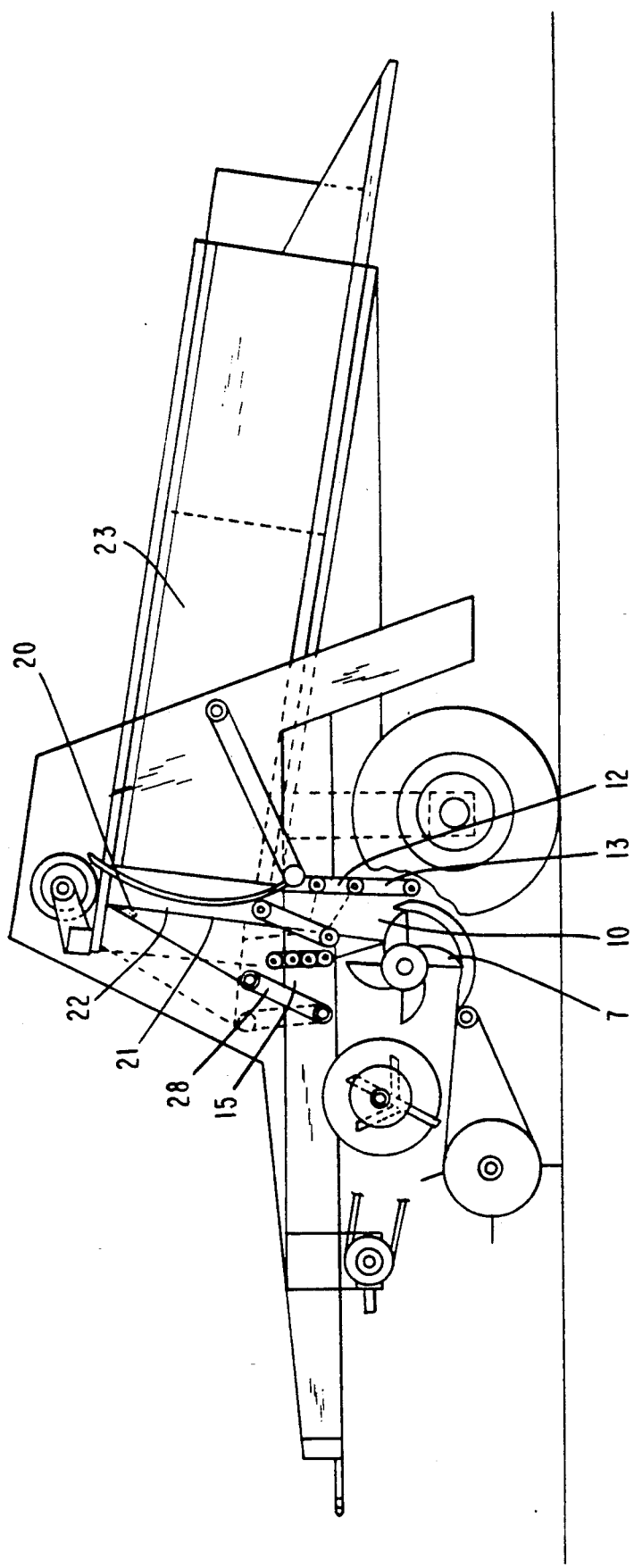
FIG. 4 shows a preferred embodiment of the invention similar to that of FIG. 1.

FIG. 4 shows the most preferred embodiment of the invention without the conveying device 18 of FIG. 1 or 3. Here the compressing drum 6 urges the compressed layer directly through the relatively short press channel 10 into the baling chamber 23. Consequently the detector 20, initializing the movement of the compressing plate 22 is arranged at the upper side of the baling chamber 23. The compressing plate 22 is guided by swing-levers 28 to ensure the reciprocating movement of the compressing-plate 22 forth and back, as indicated by phantom lines.

Figure 5:
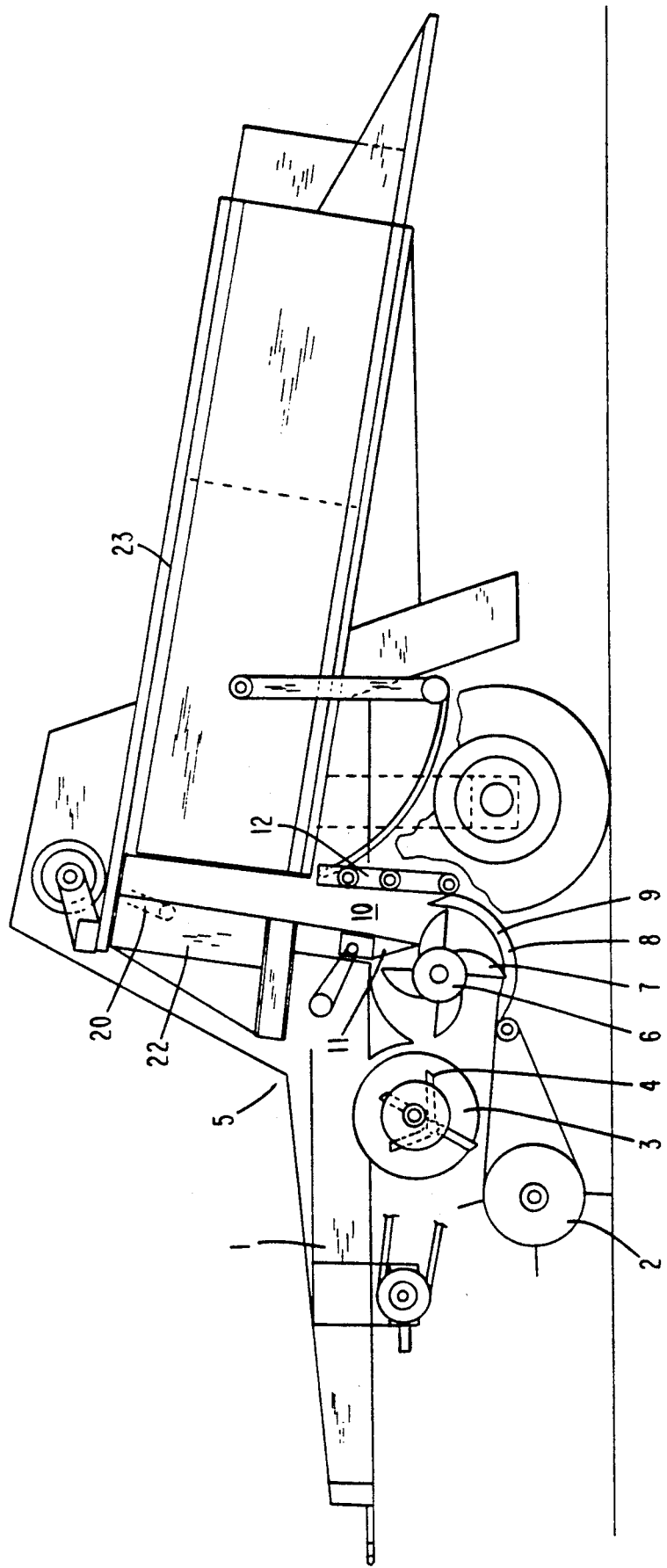
FIG. 5 shows a further preferred embodiment with a displaceable lateral wall of the press channel.

FIG. 5 shows a further embodiment having a similar configuration as in FIG. 3, wherein the compressing plate 22 is shown in its retracted position;thus the layer formed in the press channel 10 may be directly urged into the baling chamber 23.

Figure 6:
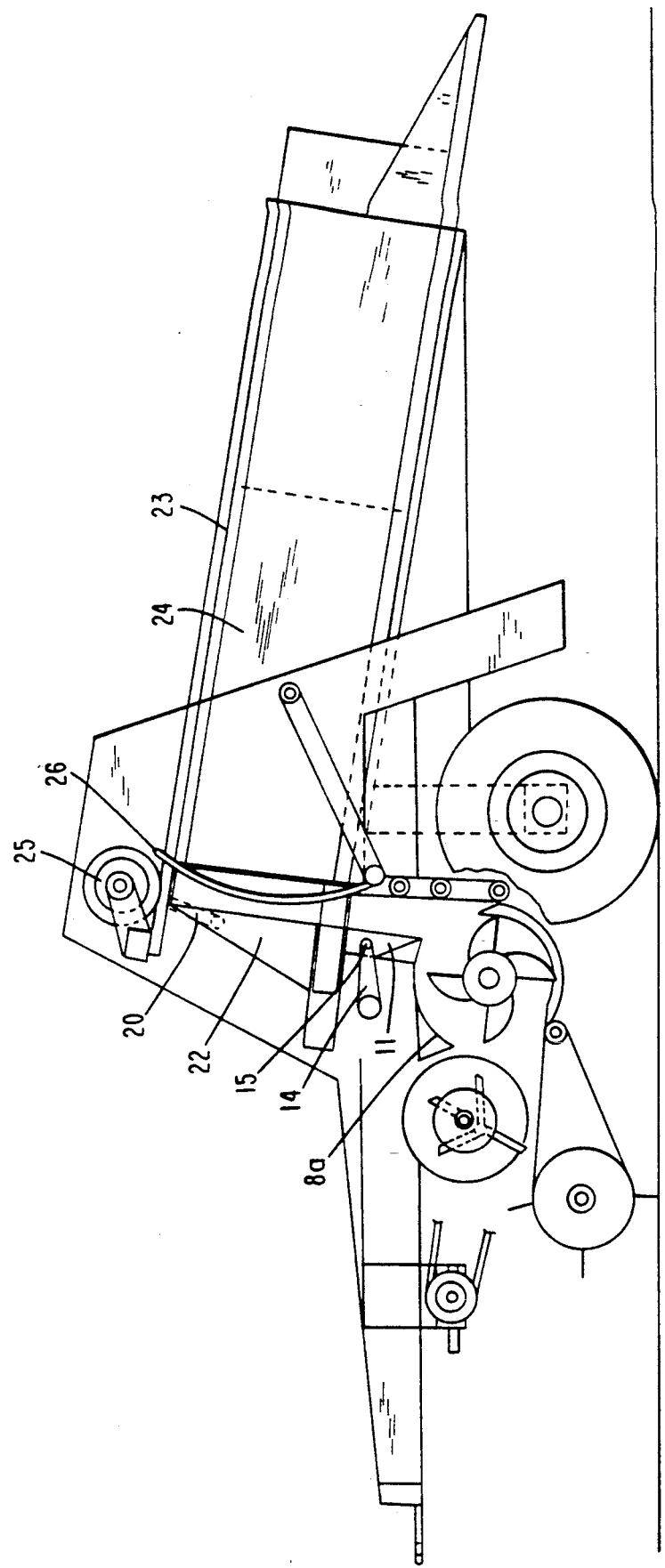
FIG. 6 shows a big baler according FIG. 5 with displaced top wall.
Figure 7:
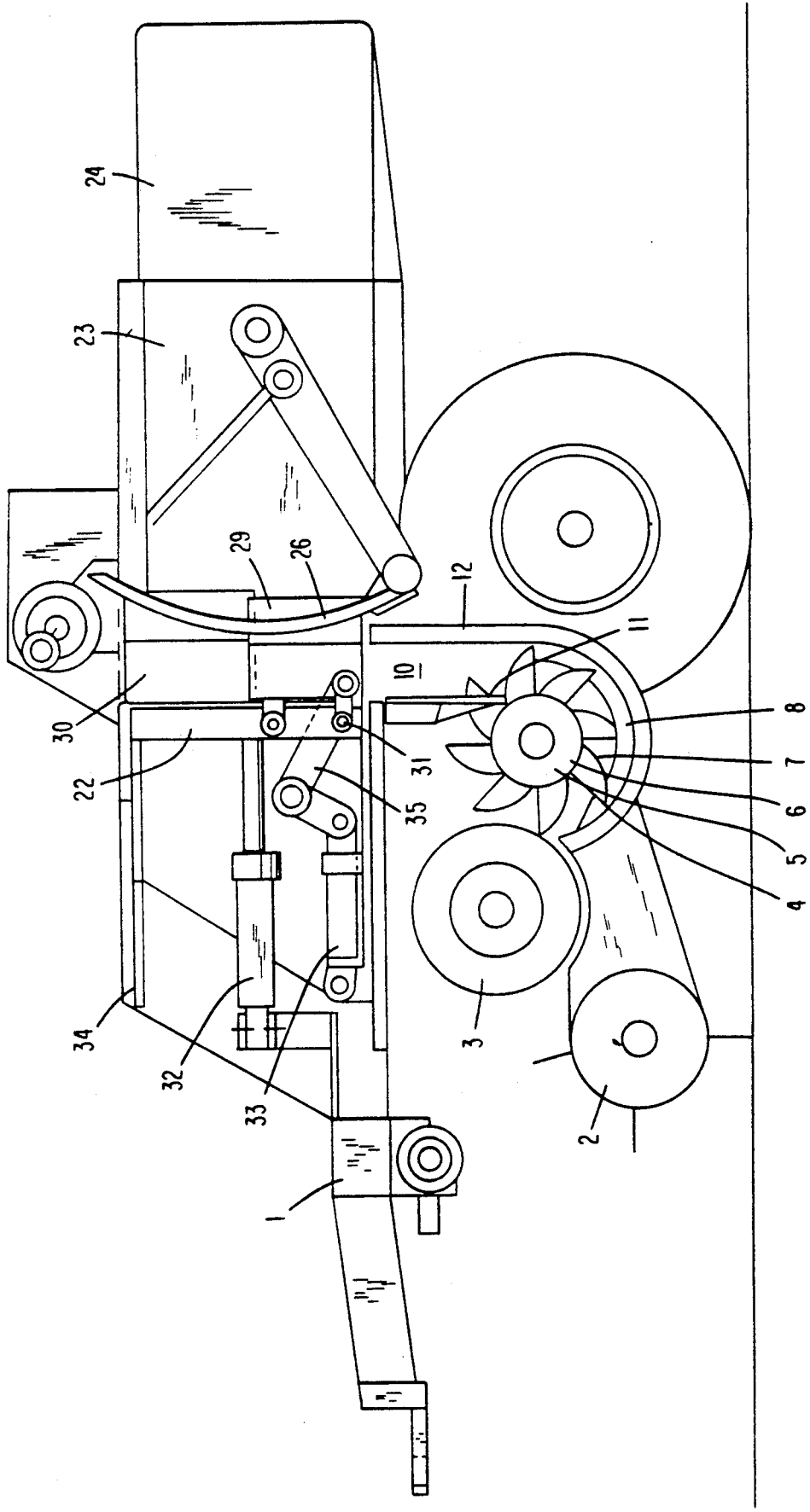
FIG. 7 shows another embodiment of a big baler with a telescopable compressing plate.
Figure 8:
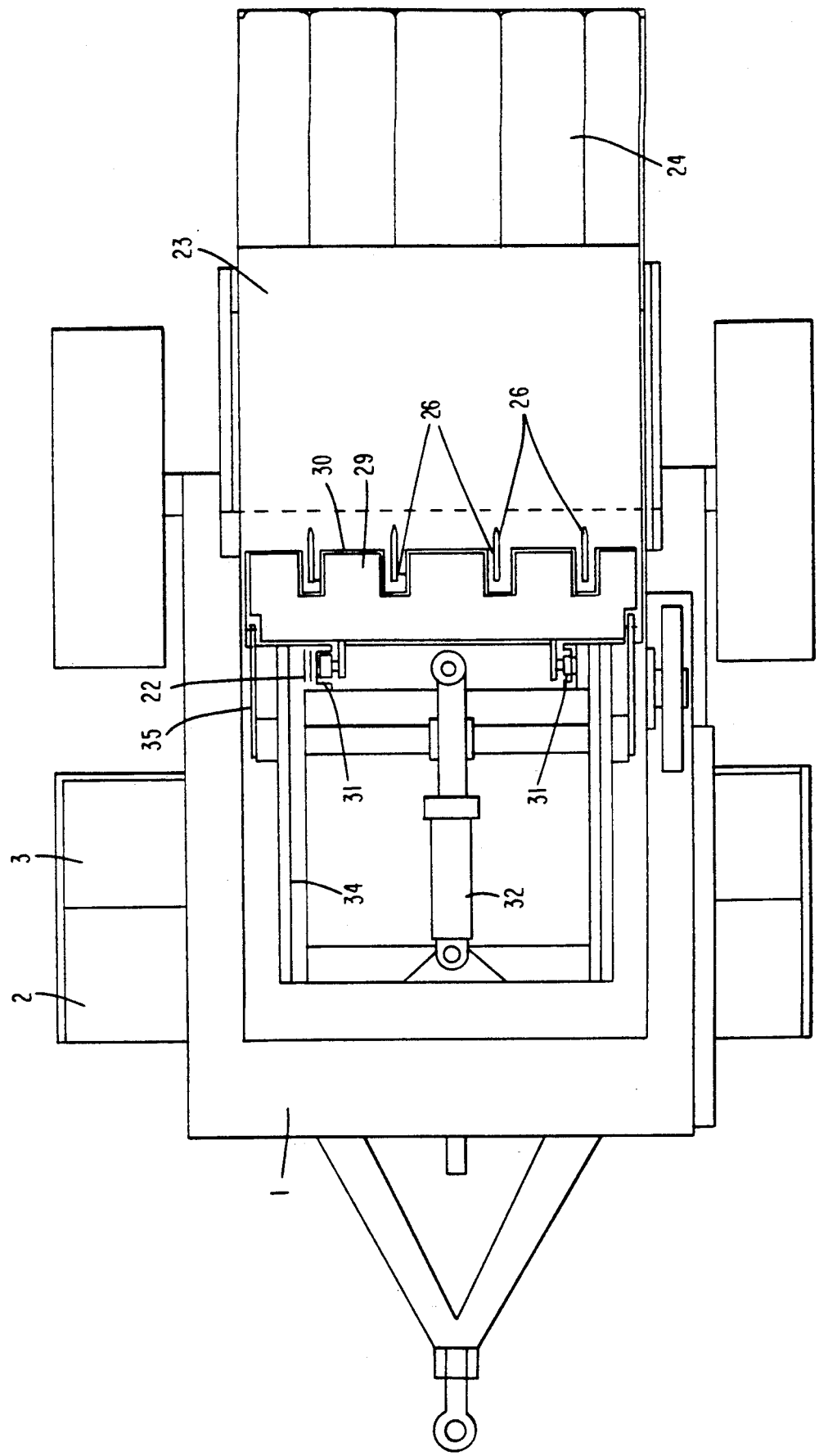
FIG. 8 shows a top view of the baler according to FIG. 7.

According to FIG. 6 the compressing plate 22 pressing at the flat or main side of the layer is shown in its forward compressing position. Since in continuous operation further field-fodder is compressed between the tines 7 of the drum 6 and the grooves 9 in the drum casing 8 and compacted in the press channel 10, the layer in the press channel 10 might be over-densified. To prevent this,the slotted wall 11 may be lifted while the inlet opening 21 to the baling chamber 23 is closed by the bottom of the compressing plate 22, thus expanding the volume of the press channel 10. By this measure, the layer in a short press channel 10 is not over densified, as the crop fed to the compressing device 5 is not further compacted but merely conveyed around the drum 6 in the portion 8a of the drum casing, whilst the inlet opening 21 of the baling chamber 23 is closed.

As explained above by the crop baler according to the invention properly shaped and highly densified bales are produced with relatively light-weight and simple compacting means. Thus, the very massive and expensive pitman-and-crank-mechanism of convential balers necessary to apply a compression pressure of about 800 pounds per square foot can be avoided.

It is to be emphasized that the baler of the most preferred embodiment shown in FIGS. 4, 5 and 6 needs no additional packer or stuffer device, as the compacting drum conveys the compressed layer directly into the baling chamber up to the detector provided at the upper side of said baling chamber. Due to this structure complicated drive means for achieving a rapid operation of a packer - as described in U.S. Pat. No. 4,157,643 is completely avoided.

I claim

1. A crop baler for harvesting of field-fodder like hay, straw, grass-silage and forming substantially rectangular bales thereof in a baling chamber comprising:
   pick-up means for picking up the field-fodder from the ground;
   a compressing drum rotating in a drum casing and provided with tines for shredding and crushing the field-fodder picked up by said pick-up means to a highly densified layer;
   a press channel forming an output of the compression drum, having a slotted portion for permitting passage of said tines and conveying said layer formed in said compression drum by further densifying said layer through an inlet opening into said baling chamber;
   a compressing plate arranged at an end surface of said baling chamber and reciprocatable in said baling chamber by a distance approximately corresponding to the width of said press channel for pressing said layers accumulating in said baling chamber in said direction toward an discharge opening of said baling chamber; and a detector means arranged near an upper side of said baling chamber for initializing said reciprocating movement of said compressing plate upon arrival of said layer at said upper side of said baling chamber.

2. The crop baler of claim 1, further comprising longitudinal grooves formed in said drum casing and meshing with said tines during rotation of said compressing drum.

3. The crop baler according to claim 1, further comprising means for actively conveying said layer in said presschannel to said baling chamber.

4. The crop baler according to claim 3, wherein the length of said press channel corresponds to the height of said baling chamber.

5. The crop baler according to claim 2, wherein said press channel comprises adjustable walls to vary the degree of pre-compression of said layer.

6. The crop baler according to claim 2 , further comprising a knotting device means and counting means, actuating said knotting device means after an adjustable number of reciprocations of said pressing plate.

* * * * *